US012633825B2

(12) United States Patent (10) Patent No.: US 12,633,825 B2
Lawrence et al. (45) Date of Patent: May 19, 2026

(54) POWER CONVERTER HAVING NON-LINEAR COMPENSATION FOR VARIABLE SOURCE IMPEDANCE

(71) Applicant: CIRRUS LOGIC INTERNATIONAL SEMICONDUCTOR LTD., Edinburgh (GB)

(72) Inventors: Jason W. Lawrence, Austin, TX (US); Graeme G. Mackay, Austin, TX (US); Hasnain Akram, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 198 days.

(21) Appl. No.: 18/667,387

(22) Filed: May 17, 2024

(65) Prior Publication Data

US 2025/0300554 A1 Sep. 25, 2025

Related U.S. Application Data

(60) Provisional application No. 63/567,309, filed on Mar. 19, 2024.

(51) Int. Cl.
| | |
|---|---|
| *H02M 3/156* | (2006.01) |
| *G05F 1/575* | (2006.01) |
| *H02M 1/32* | (2007.01) |

(52) U.S. Cl.
CPC ............. *H02M 3/156* (2013.01); *H02M 1/32* (2013.01); *G05F 1/575* (2013.01)

(58) Field of Classification Search
CPC ............................... H02M 3/156; G05F 1/575
See application file for complete search history.

(56) References Cited

U.S. PATENT DOCUMENTS

| | | | |
|---|---|---|---|
| 8,080,769 B2 | 12/2011 | Smith et al. | |
| 10,212,514 B2 | 2/2019 | Serwy et al. | |
| 10,231,050 B2 | 3/2019 | Serwy et al. | |
| 10,882,412 B2 | 1/2021 | Mrlik et al. | |
| 10,952,299 B1 * | 3/2021 | Xiong ................. | H02M 1/0058 |
| 2019/0229611 A1 * | 7/2019 | Chizuwa ................. | H02M 1/32 |
| 2021/0333814 A1 * | 10/2021 | Breslin ................... | G05F 1/575 |
| 2023/0043741 A1 * | 2/2023 | Jovanovic ........... | H02M 3/1566 |

OTHER PUBLICATIONS

Search Report in UK application GB2503766.4 mailed on Sep. 25, 2025 (pp. 1-7 in pdf).

* cited by examiner

*Primary Examiner* — Gary A Nash
(74) *Attorney, Agent, or Firm* — Mitch Harris, Atty at Law, LLC; Andrew M. Harris

(57) ABSTRACT
A power converter circuit provides stable operation over wide ranges of power source impedance supplying energy to the power converter circuit. The power converter circuit includes an input terminal for receiving energy from an external power source, and a switching converter circuit that receives an input current from the input terminal at an input terminal voltage level and produces an output current or voltage. The switching converter circuit receives a control variable that sets a level of the input current drawn from the input terminal. The power converter circuit also includes a control circuit that determines an indication of an impedance or a change in impedance between the external power source and the input terminal, and generates the control variable in conformity therewith, so that a voltage drop between the external power source and the input terminal is limited by adjustment of the control variable.

22 Claims, 6 Drawing Sheets

POWER CONVERTER HAVING NON-LINEAR COMPENSATION FOR VARIABLE SOURCE IMPEDANCE

FIELD OF THE DISCLOSURE

The field of representative embodiments of this disclosure relates to power conversion circuits, and in particular, to a power converter and control method that compensate for variations in the source impedance at the power converter input.

BACKGROUND

Switched-power conversion circuits are commonly used in power supplies and amplification systems due to high power efficiency and reduced magnetic component weight and size. By switching current at a frequency greater than the frequencies to be reproduced by an amplifier, or by switching energy generally, in the case of switching power supplies, the size of magnetic components is reduced and losses required by linear circuit operation are eliminated.

When operating such power conversion circuits from a variable-impedance input source, for example a long cable attached to a battery vs. a charger circuit or an internal battery, the variation in the source impedance causes changes in the open loop gain of the power converter, since the input current level commanded to reach a target output voltage or current is typically a function of a difference between the input voltage level and a target input voltage level for the power converter. Since the difference is then integrated to provide the current control value, the open loop gain is very sensitive to change in the source impedance, which may cause unstable operation in the power converter.

Other types of power converter control loops use comparison circuits to determine when the input voltage level deviates from the target input voltage for the converter, and then result of the comparison is integrated to produce the current level control. Variation in source impedance may cause such converters to enter limit cycle operation, resulting in oscillations at an inherent resonant frequency of the power converter.

Therefore, it would be advantageous to provide a power converter circuit that is able to compensate for variations in the impedance of the input power source connected to the power converter.

SUMMARY

A power converter that compensates for variations in the impedance of the power source connected to the inverter is provided in a power converter circuit and its method of operation.

In some embodiments of the disclosure, the power converter circuit includes an input terminal for receiving energy from an external power source, and a switching converter circuit that receives an input current from the input terminal at an input terminal voltage level and produces an output current or voltage. The switching converter circuit receives a control variable that sets a level of the input current drawn from the input terminal. The power converter circuit also includes a control circuit that determines an indication of an impedance or a change in impedance between the external power source and the input terminal and generates the control variable in conformity with the indication of impedance or change in impedance, so that a voltage drop between the external power source and the input terminal is limited by adjustment of the control variable.

In some embodiments of the disclosure, the input terminal receives the energy from a direct-current (DC) power source connected to the input terminal by a cable, and the control circuit determines an indication of an impedance or a change in the impedance of the cable and adjusts the control variable in conformity with the indication of impedance or change in the impedance of the cable.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION

The present disclosure encompasses systems, circuits and integrated circuits that provide compensation for variations in output impedance of a source providing energy to a power converter circuit. The power converter circuit includes an input terminal for receiving energy from an external power source, and a switching converter circuit that receives an input current from the input terminal at an input terminal voltage level and produces an output current or voltage. The switching converter circuit may receive a control variable that sets a level of the input current drawn from the input terminal. The power converter circuit may also include a control circuit that determines an indication of an impedance or a change in impedance between the external power source and the input terminal and generates the control variable in conformity with the indication of impedance or change in impedance, so that a voltage drop between the external power source and the input terminal is limited by adjustment of the control variable. In some embodiments, the input terminal may receive the energy from a direct-current (DC) power source connected to the input terminal by a cable, and the control circuit may determine an indication of an impedance or a change in the impedance of the cable and may adjust the control variable in conformity with the indication of impedance or change in the impedance of the cable.

Figure 1:
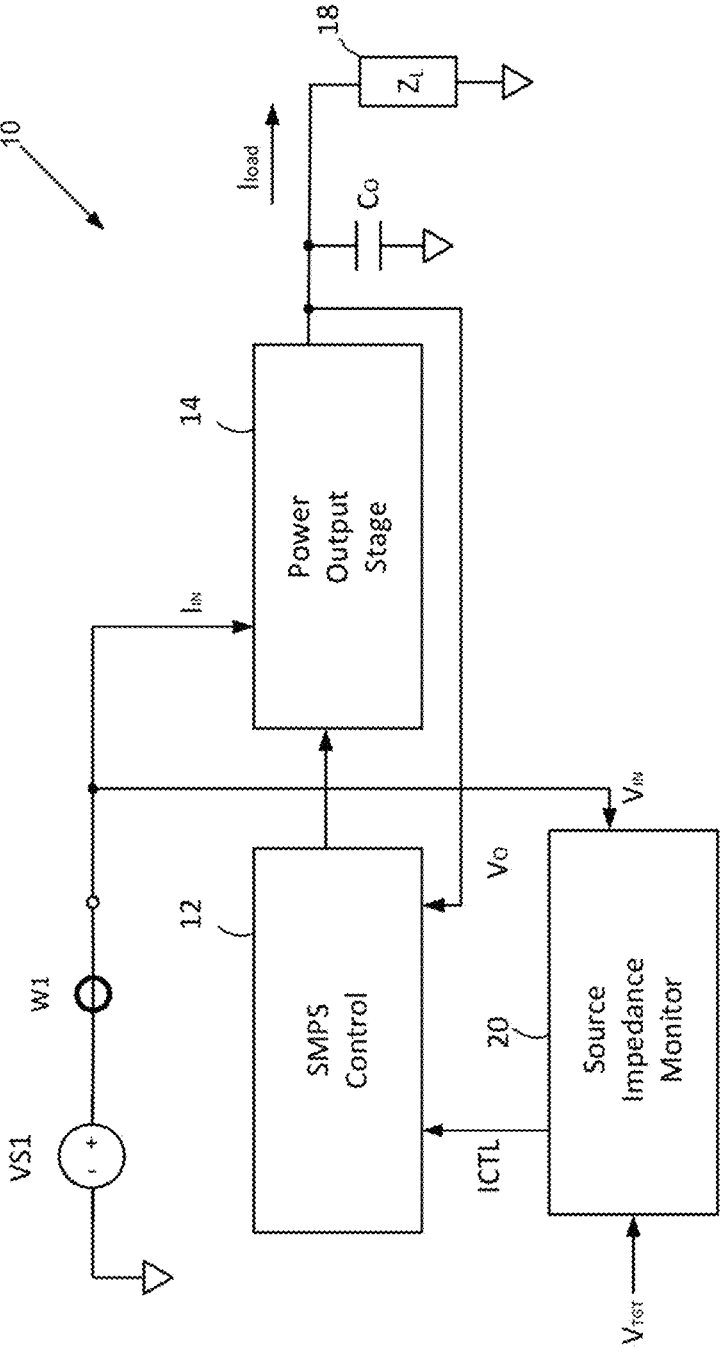
FIG. 1 is a block diagram illustrating an example power converter 10, in accordance with an embodiment of the disclosure.

Referring now to FIG. 1, a block diagram of an example power converter circuit 10 is shown, in accordance with an embodiment of the disclosure. A switched-mode power supply (SMPS) control block 12 provides switching control signals to a power output stage 14 that generates a power output to a load 18, according to an implemented switching topology. Power output stage 14 is coupled to an output capacitor Co that filters the output of power output stage 14 and to load 18 represented by an impedance $Z_L$. A voltage feedback loop, which alternatively may be a current feedback loop when load current $I_{load}$ is controlled, rather than output voltage $V_O$, supplies a feedback signal to SMPS control block 12 to control the switching control signals provided to power output stage 14. Power output stage 14 receives energy from a power source, which in the example embodiment is a direct-current (DC), which may be for example, a battery, a DC power supply such as a battery charger or other DC power supply. Voltage source VS1 is connected to example power converter circuit 10 by a cable W1, but the techniques described herein are applicable to other power/energy source connected by other wiring and having other source impedance characteristics for which compensation may be required or desirable. For example, the output of an energy source providing power to power output stage 14 may have an output capacitance having a variable equivalent series resistance (esr) that varies with temperature or over a wide manufacturing tolerance range. In order to compensate for variations in the impedance of cable W1 (or other impedance variations of the connection to the input of power output stage 14), example power converter 10 includes a source impedance monitor circuit 20 that receives a target/commanded input voltage value $V_{TGT}$ along with an actual value of input voltage $V_{IN}$, and generates a control signal ICTL that is provided to SMPS control block 12 to vary one or more parameters of SMPS control block 12, in order to control a value of input current $I_{IN}$ drawn by power output stage 14. By stabilizing the value of input current $I_{IN}$ over variations in the source impedance imposed by cable W1 and battery B1, example power converter is compensated for variations in the source impedance that may otherwise cause unstable operation or other undesirable operating characteristics. While the above description and various embodiments illustrated herein are directed to a switched-mode power supply (SMPS), it is understood that the techniques disclosed herein may be used in other power conversion systems, such as Class-D amplifiers.

Figure 2A:
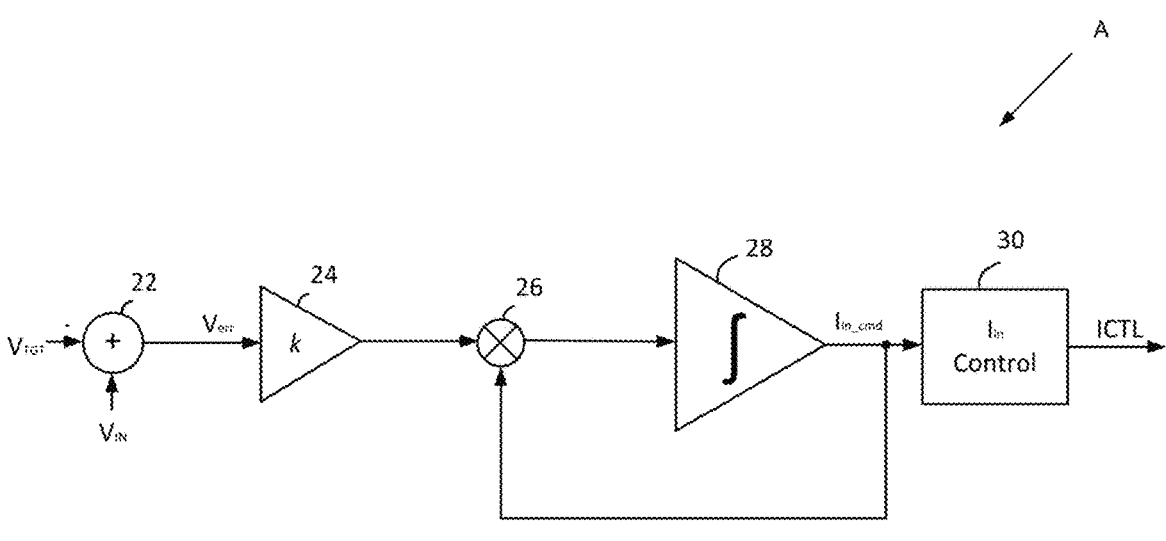
FIG. 2A and FIG. 2B are simplified schematic diagrams illustrating details of example source impedance monitor circuits 20A and 20B, respectively, that may be used within implementations of example power converter 10 of FIG. 1, in accordance with embodiments of the disclosure.

Referring now to FIG. 2A, a simplified schematic diagram illustrating details of an example source impedance monitor circuit 20A, that may be used within implementations of example power converter 10 of FIG. 1 is shown, in accordance with an embodiment of the disclosure. An input combiner 22 subtracts target/commanded input voltage value $V_{TGT}$ from an actual value of input voltage $V_{IN}$ to generate an error signal Verr. A scaler 24 scales error signal Verr, and a multiplier 26 multiplies the scaled version of error signal Verr by an integrated control output signal $I_{in\_cmd}$ provided by an integrator 28 that integrates the output of multiplier 26, to form an integral adaptive control loop. As the source impedance increases or decreases, error signal Verr increases or decreases, correspondingly. Multiplier 26 scales error signal Verr by control output signal $I_{in\_cmd}$, which reduces the loop gain for low values of control output signal $I_{in\_cmd}$, which corresponds to high values of resistance of cable W1, which provides increased stability under higher cable resistance conditions. A transformation block 30 transforms control output signal $I_{in\_cmd}$ into one or more control input values ICTL, which as described above, are used to adjust input current $I_{in}$ drawn by power output stage 14 of example power converter 10 of FIG. 1. Other adaptive control topologies are contemplated in accordance with alternative embodiments, such as proportional-integral-derivative (PID) control, PI/PID controllers that include saturation at the inputs of the integrator to limit the slew rate of the control loop, and/or saturation at the output of the integrator prior to the feedback node to provide anti-windup and ensure stability. The saturation limits may be asymmetric, in order to provide separate control of the slew rate for positive vs. negative error.

Figure 2B:
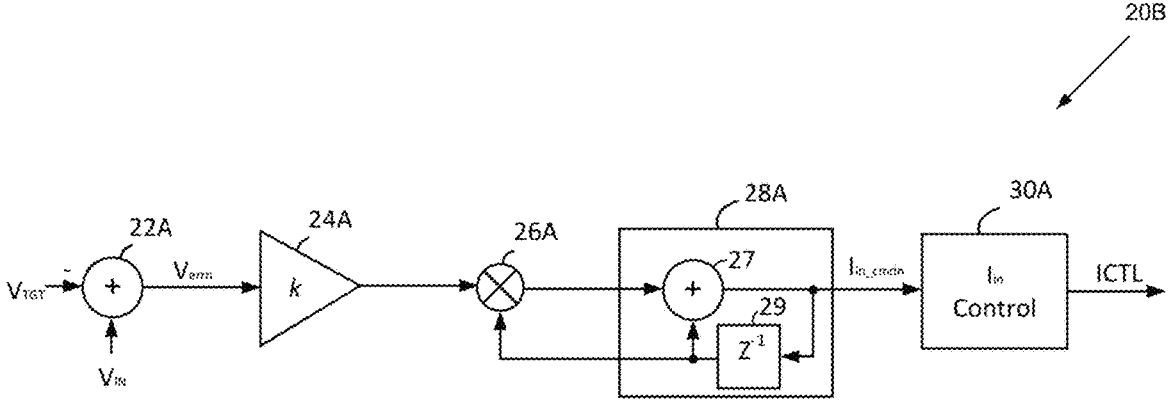

Referring now to FIG. 2B, a simplified schematic diagram illustrating details of another example source impedance monitor circuit 20B, that may be used within implementations of example power converter 10 of FIG. 1 is shown, in accordance with an embodiment of the disclosure. An adder 22A subtracts target/commanded input voltage value $V_{TGT}$ from an actual value of input voltage $V_{IN}$ to generate error values Verrn. A multiplier 24A scales error signal Verrn, and another multiplier 26A multiplies the scaled version of error signal Verrn by integrated control output values $I_{in\_cmdn}$ provided by a discrete-time integrator 28A formed by a delay 29 and an adder 27, which integrates/accumulates the output of multiplier 26A, to form the integral adaptive control loop. A transformation block 30A transforms control output values $I_{in\_cmdn}$ into one or more control input values ICTL, which as described above, are used to adjust input current $I_{in}$ drawn by power output stage 14 of example power converter 10 of FIG. 1. The above-described operation is expressed by $I_{in\_cmdn} = I_{in\_cmd(n-1)} (1+kV_{errn})$.

Figure 3A:
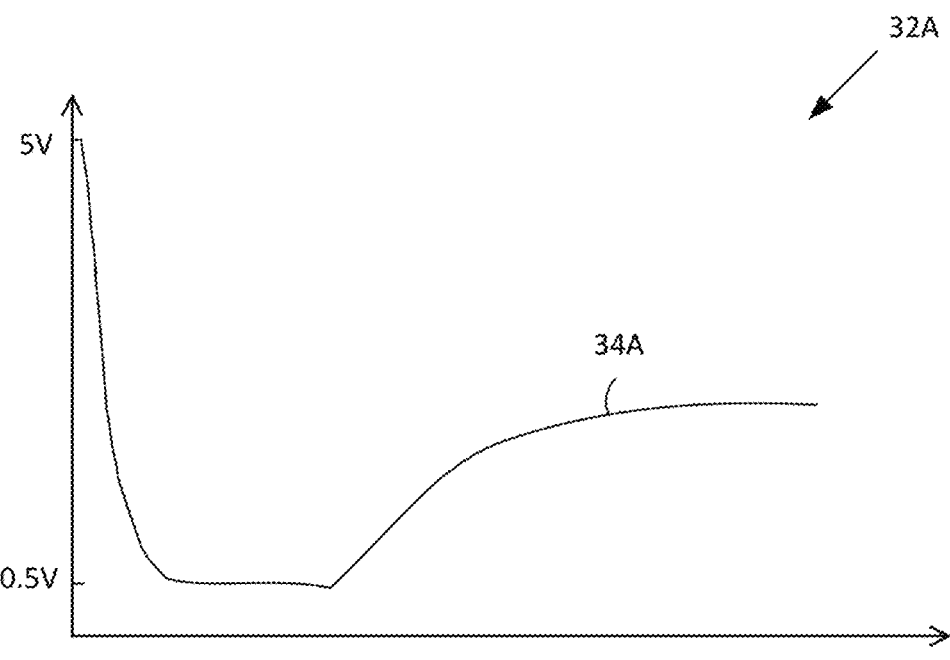
FIG. 3A and FIG. 3B are example signal waveform diagrams 32A and 32B, respectively, illustrating example signal waveforms within example power converter 10 of FIG. 1, in accordance with embodiments of the disclosure.
Figure 3B:
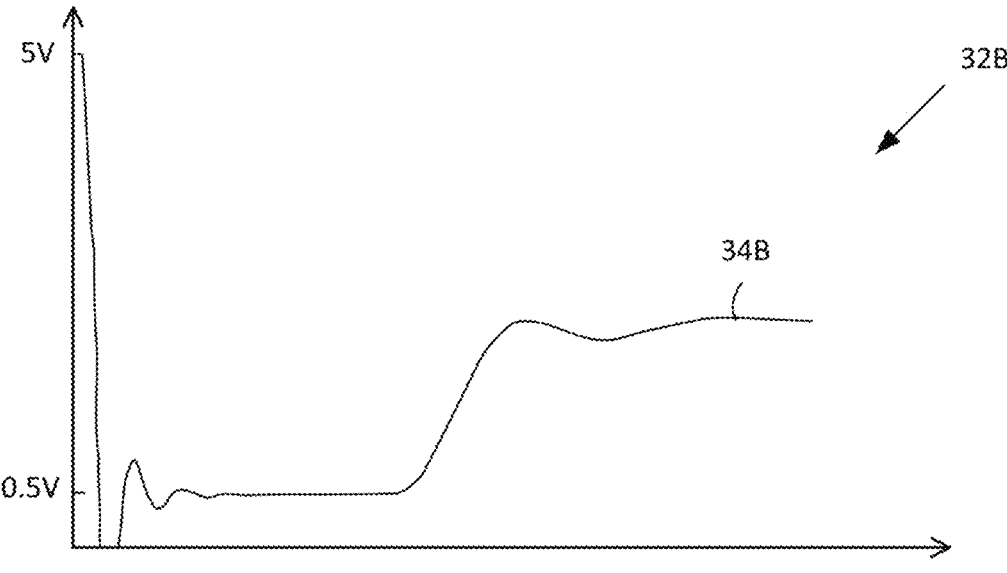

FIG. 3A and FIG. 3B are example signal waveform diagrams illustrating example signal waveforms within example power converter 10 of FIG. 1, in accordance with embodiments of the disclosure. FIG. 3A illustrates a transient response of example power converter 10 when the resistance of cable W1 is 0.5 ohm as a voltage waveform 34A, while FIG. 3B illustrates a transient response of example power converter 10 when the resistance of cable W1 is 10 ohm as a voltage waveform 34B, demonstrating stable operation over at least a 50:1 range of source impedance.

Figure 4A:
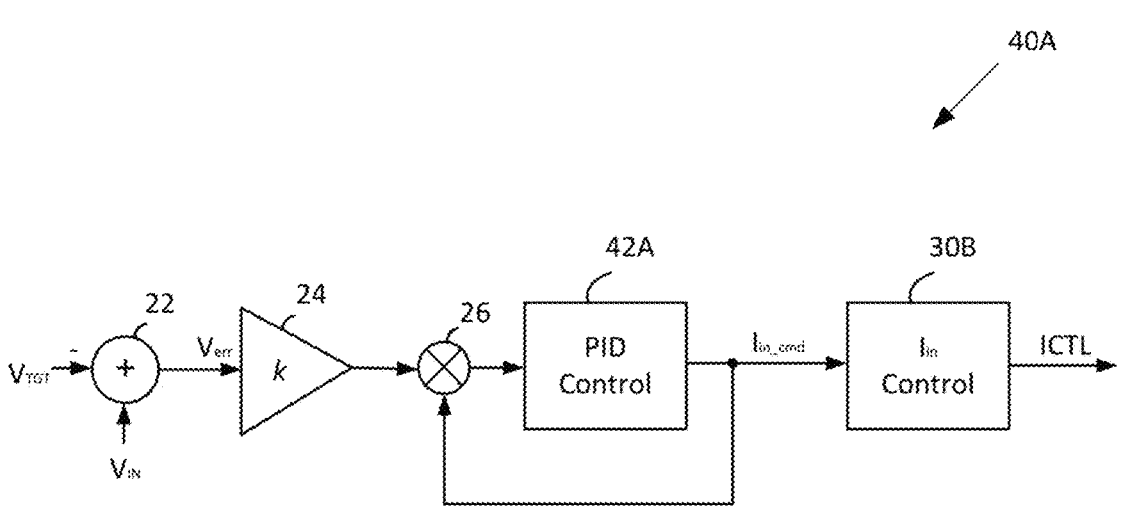
FIG. 4A and FIG. 4B are simplified schematic diagrams illustrating example current control subsystems 40A and 40B, respectively, that may be used within source impedance monitor circuit 20 of FIG. 2, in accordance with alternative embodiments of the disclosure.

Referring now to FIG. 4A, a simplified schematic illustrating example current control subsystem 40A is shown, which may be used within source impedance monitor circuit 20 of FIG. 2, in accordance with another embodiment of the disclosure. After combiner 22 and scaler 24, which are described above with reference to FIG. 2A, a proportional-integral-derivative (PID) controller 42A replaces integrator 28 of FIG. 2A, the output of which is provided to multiplier 26, which scales error signal Verr as described above with reference to FIG. 2A, and to a transformation block 30B that transforms control output signal $I_{in\_cmd}$ into one or more control input values ICTL, which as described above, are used to adjust input current $I_{in}$ drawn by power output stage 14 of example power converter 10 of FIG. 1. Similar changes may be made to the discrete-time implementation of example source impedance monitor circuit 20B of FIG. 2B, to provide a discrete time PID implementation.

Figure 4B:
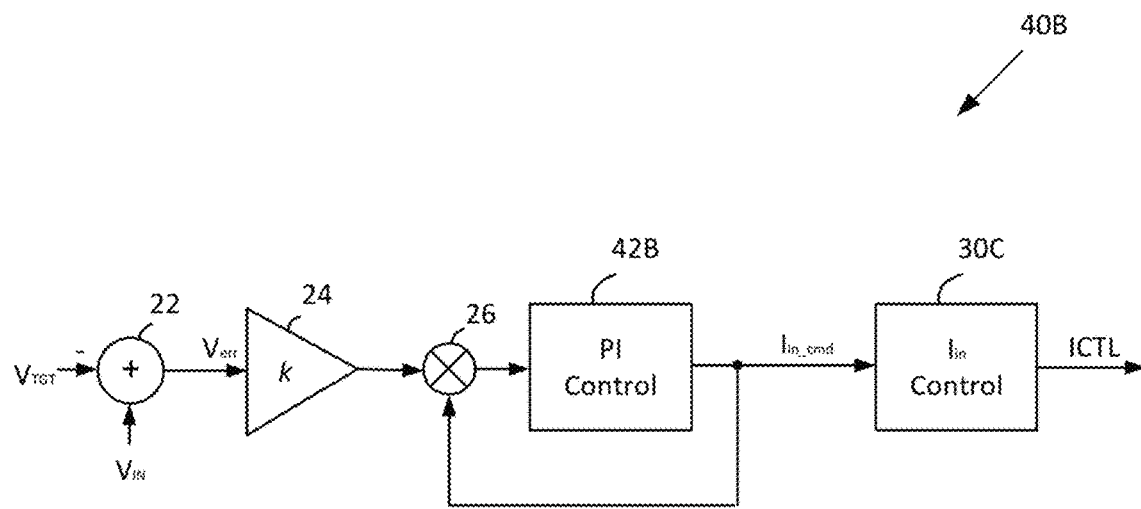

Referring now to FIG. 4B, a simplified schematic illustrating another example current control subsystem 40B is shown, as may be used within source impedance monitor circuit 20 of FIG. 2, in accordance with another embodiment of the disclosure. After combiner 22 and scaler 24, which are described above with reference to FIG. 2A, a proportional-integral (PI) controller 42B replaces integrator 28 of FIG. 2A, the output of which is provided to multiplier 26, which scales error signal Verr as described above with reference to FIG. 2A, and to a transformation block 30C that transforms control output signal $I_{in\_cmd}$ into one or more control input values ICTL, which as described above, are used to adjust input current $I_{in}$ drawn by power output stage 14 of example power converter 10 of FIG. 1. Similar changes may be made to the discrete-time implementation of example source impedance monitor circuit 20B of FIG. 2B, to provide a discrete time PI implementation.

Figure 5:
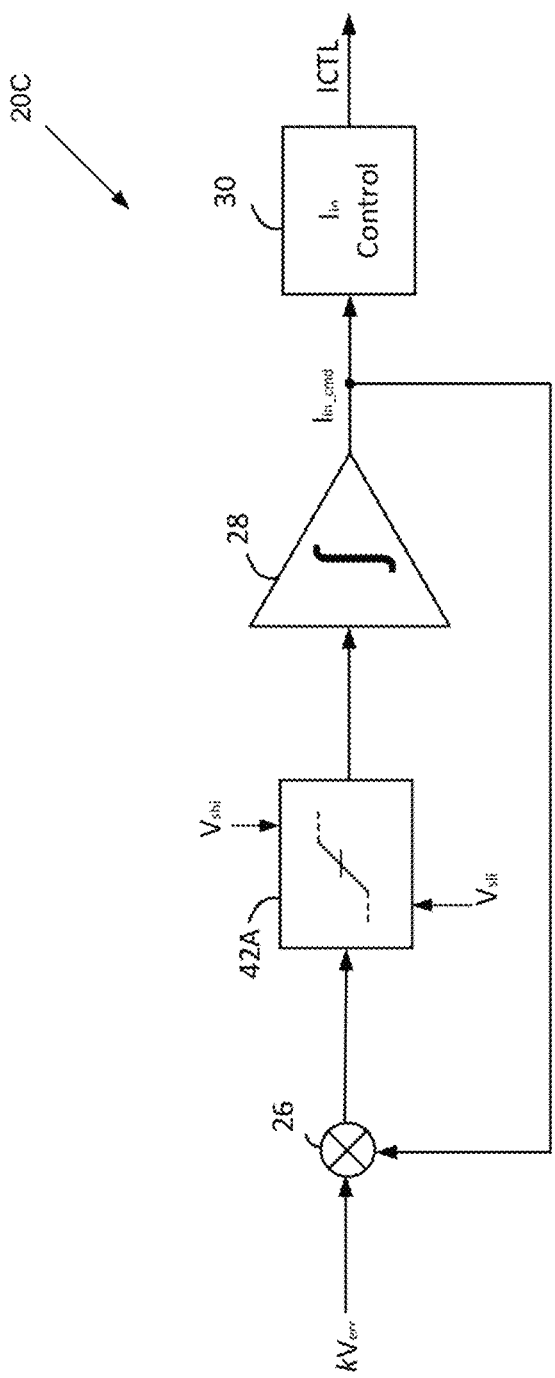
FIG. 5 is a simplified schematic diagram illustrating an example source impedance monitor circuit 20C in accordance with an alternative embodiment of the disclosure.

Referring now to FIG. 5, a simplified schematic diagram illustrating an example source impedance monitor circuit 20C is shown, in accordance with an alternative embodiment of the disclosure. Example source impedance monitor circuit 20C is similar to source impedance monitor circuit 20A of FIG. 2A, so only differences between them will be described below. Source impedance monitor circuit 20C includes a limiter (or saturation) block 42A that limits the scaled error values received by multiplier 26, which limits the slew rate of the input current control algorithm implemented by source impedance monitor circuit 20C. Similar modifications may also be made to any of the above-described source impedance monitor circuits.

Figure 6:
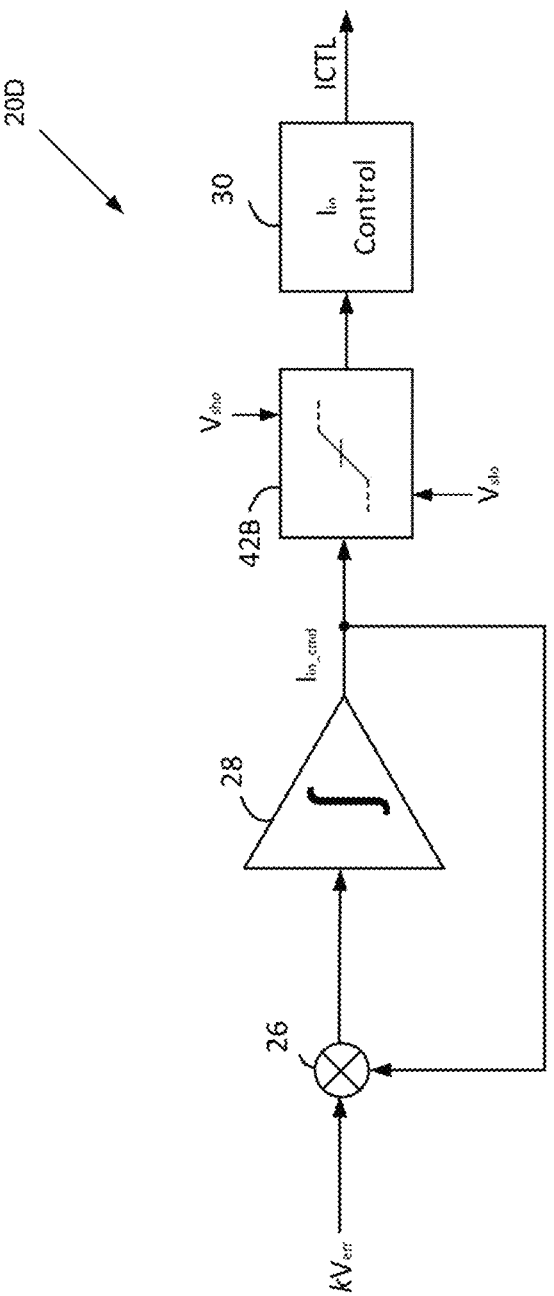
FIG. 6 is a simplified schematic diagram illustrating an example source impedance monitor circuit 20D in accordance with an alternative embodiment of the disclosure.

Referring now to FIG. 6, a simplified schematic diagram illustrating an example source impedance monitor circuit 20D is shown, in accordance with an alternative embodiment of the disclosure. Example source impedance monitor circuit 20D is similar to source impedance monitor circuit 20A of FIG. 2A, so only differences between them will be described below. Source impedance monitor circuit 20D includes a limiter (or saturation) block 42B that limits the output of integrator 28, which provides anti-windup operation and ensures stability of the input current control algorithm implemented by source impedance monitor circuit 20D. Similar modifications may also be made to any of the above-described source impedance monitor circuits, and saturators/limiter may be used as illustrated in both FIG. 5 and FIG. 6, proving limitation of both control slew rate and bounding of the output of integrator 28.

In summary, this disclosure shows and describes techniques and circuits for power conversion and power converter circuits. The power converter circuits may include an input terminal for receiving energy from an external power source, a switching converter circuit that receives an input current from the input terminal at an input terminal voltage level and produces an output current or voltage, and the switching converter circuit may receive a control variable that sets a level of the input current drawn from the input terminal. The power converter circuits may also include a control circuit that determines an indication of an impedance or a change in the impedance between the external power source and the input terminal and generates the control variable in conformity with the indication of impedance or change in the impedance. The control variable may be adjusted so that a voltage drop between the external power source and the input terminal is limited. In other embodiments, the input terminal may receive the energy from a direct-current (DC) power source connected to the input terminal by a cable, and the control circuit may determine an indication of an impedance or a change in the impedance of the cable and may adjust the control variable in conformity with the indication of impedance or change in the impedance of the cable.

In some example embodiments, the impedance may be an impedance of a cable that connects the external power source to the switching converter circuit, and the control circuit may operate to reduce an effect of the impedance on an operation of the switching converter circuit. In some example embodiments, the control circuit may operate to maintain the input terminal voltage level within a predetermined range. In some example embodiments, the control variable may control one or more parameters of the switching converter circuit.

In some example embodiments, the adaptive controller implements asymmetric saturation at an input of an integrator of the controller to provide slew rate control of adjustment of the control variable. In some example embodiments, the adaptive controller implements saturation at an output of an integrator of the controller to provide anti-windup operation and to provide stability of the controller.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to another type of power conversion system.

What is claimed is:

1. A power converter circuit, comprising:
an input terminal for receiving energy from an external power source;
a switching converter circuit that receives an input current from the input terminal at an input terminal voltage level and produces an output current or voltage, wherein the switching converter circuit receives a control variable that sets a level of the input current drawn from the input terminal; and
a control circuit that determines an indication of an impedance or a change in the impedance between the external power source and the input terminal by receiving an error value representing a difference between the input terminal voltage level and a target voltage level at an adaptive controller of the control circuit, and wherein the adaptive controller adaptively adjusts the control variable in conformity with the error value, so that a voltage drop between the external power source and the input terminal is limited by adjustment of the control variable over a range of the input current received from the input terminal.

2. The power converter circuit of claim 1, wherein the impedance is an impedance of a cable that connects the external power source to the switching converter circuit, and wherein the control circuit operates to reduce an effect of the impedance on stability of the switching converter circuit.

3. The power converter circuit of claim 2, wherein the control circuit operates to maintain the input terminal voltage level within a predetermined range.

4. The power converter circuit of claim 1, wherein the control circuit operates to maintain the input terminal voltage level within a predetermined range.

5. The power converter circuit of claim 4, wherein the control circuit determines whether or not the indication of impedance indicates that the impedance is greater than a threshold value, and sets the control variable to reduce the input current to prevent the input terminal voltage level from falling to a value below the predetermined range.

6. The power converter circuit of claim 1, wherein the control variable controls one or more parameters of the switching converter circuit.

7. The power converter circuit of claim 1, wherein the adaptive controller includes a proportional-integral or proportional-integral-derivative controller that receives the error value and generates the control value.

8. The power converter circuit of claim 7, wherein the adaptive controller implements asymmetric saturation at an input of an integrator of the controller to provide slew rate control of adjustment of the control variable.

9. The power converter circuit of claim 7, wherein the adaptive controller implements saturation at an output of an integrator of the controller to provide anti-windup operation and to provide stability of the controller.

10. The power converter circuit of claim 7, further comprising applying saturation at an output of an integrator of the adaptive controller to provide anti-windup operation and to provide stability of the controller.

11. A method of operation of a power converter circuit, the method comprising:

receiving energy from an external power source at an input terminal of the power converter circuit;

producing an output current or voltage with a switching converter circuit by receiving an input current from the input terminal at an input terminal voltage level;

setting a level of the input current drawn from the input terminal by providing a control variable to the switching converter circuit;

determining an indication of an impedance or a change in the impedance between the external power source and the input terminal;

receiving an error value representing a difference between the input terminal voltage level and a target voltage level at an adaptive controller; and adjusting the control variable in conformity with the error value to limit a voltage drop between the external power source and the input terminal, over a range of the input current received from the input terminal.

12. The method of claim 11, further comprising connecting the external power source to the switching converter circuit with a cable, wherein the impedance is an impedance of the cable, and wherein the adjusting operates to reduce an effect of the impedance on stability of the switching converter circuit.

13. The method of claim 12, wherein the adjusting maintains the input terminal voltage level within a predetermined range.

14. The method of claim 11, wherein the adjusting maintains the input terminal voltage level within a predetermined range.

15. The method of claim 14, wherein the determining determines whether or not the indication of impedance indicates that the impedance is greater than a threshold value, and wherein the adjusting sets the control variable to reduce the input current to prevent the input terminal voltage level from falling to a value below the predetermined range.

16. The method of claim 11, wherein the control variable controls one or more parameters of the switching converter circuit.

17. The method of claim 11, wherein the adaptive controller performs proportional-integral or proportional-integral-derivative control.

18. The method of claim 17, further comprising applying asymmetric saturation at an input of an integrator of the adaptive controller to provide slew rate control of adjustment of the control variable.

19. A method of operation of a power converter circuit, the method comprising:

receiving energy from a direct-current (DC) power source connected by a cable to an input terminal of the power converter circuit;

producing an output current or voltage with a switching converter circuit by receiving an input current from the input terminal;

determining an error value representing a difference between the input terminal voltage level and a target voltage level at an adaptive controller; and adaptively adjusting the input current received from the input terminal in conformity with the error value, over a range of the input current.

20. The method of claim 19, wherein the adjusting is performed so that a voltage drop across the cable is limited to a predetermined range.

21. A power converter circuit, comprising:

an input terminal for receiving energy from a direct-current (DC) power source connected to the input terminal by a cable;

a switching converter circuit that receives an input current from the input terminal and produces an output current or voltage, wherein the switching converter circuit receives a control variable that sets a level of the input current drawn from the input terminal; and a control circuit that determines an indication of an impedance or a change in the impedance of the cable and adjusts the control variable in conformity with the indication of impedance or change in the impedance of the cable.

22. The power converter circuit of claim 21, wherein the control circuit adjusts the control variable so that a voltage drop across the cable is limited to a predetermined range.

* * * * *